United States Patent
Kim et al.

(10) Patent No.: US 12,512,513 B2
(45) Date of Patent: Dec. 30, 2025

(54) NON-AQUEOUS ELECTROLYTE SOLUTION FOR LITHIUM SECONDARY BATTERY AND LITHIUM SECONDARY BATTERY COMPRISING SAME

(71) Applicant: LG Energy Solution, Ltd., Seoul (KR)

(72) Inventors: Hyun-Seung Kim, Daejeon (KR); Yu-Ha An, Daejeon (KR); Jeong-Woo Oh, Daejeon (KR); Chul-Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 769 days.

(21) Appl. No.: 17/787,727

(22) PCT Filed: Feb. 22, 2021

(86) PCT No.: PCT/KR2021/002207
§ 371 (c)(1),
(2) Date: Jun. 21, 2022

(87) PCT Pub. No.: WO2021/167428
PCT Pub. Date: Aug. 26, 2021

(65) Prior Publication Data
US 2023/0095613 A1      Mar. 30, 2023

(30) Foreign Application Priority Data

Feb. 21, 2020   (KR) .................. 10-2020-0021885

(51) Int. Cl.
*H01M 10/0567* (2010.01)
*H01M 10/0568* (2010.01)
*H01M 50/46* (2021.01)

(52) U.S. Cl.
CPC ... *H01M 10/0567* (2013.01); *H01M 10/0568* (2013.01); *H01M 50/46* (2021.01)

(58) Field of Classification Search
CPC ........... H01M 10/0525; H01M 10/052; H01M 10/52; Y02E 60/10
See application file for complete search history.

(56) References Cited

U.S. PATENT DOCUMENTS

| 5,446,134 A | 8/1995 | Armand et al. |
| 9,166,249 B2 | 10/2015 | Darolles et al. |
| (Continued) | | |

FOREIGN PATENT DOCUMENTS

| CN | 102633725 A | 8/2012 |
| CN | 102867989 A | 1/2013 |
| (Continued) | | |

OTHER PUBLICATIONS

International Search Report for Application No. PCT/KR2021/002207 mailed Jun. 17, 2021, pp. 1-3.

*Primary Examiner* — Ula C Ruddock
*Assistant Examiner* — Sarika Gupta
(74) *Attorney, Agent, or Firm* — Lerner David LLP

(57) ABSTRACT

A non-aqueous electrolyte for a lithium secondary battery and a lithium secondary battery including the same are disclosed herein. In some embodiments, a non-aqueous electrolyte for a lithium secondary battery includes a lithium salt, an organic solvent, and an additive comprising a compound represented by the following Chemical Formula 1:

(Continued)

wherein Q is a single bond, or a substituted or non-substituted C1-C10 alkyl group, and each of A1, A2 and A3 independently represents hydrogen (H) or a substituted or non-substituted C1-C10 alkyl group. The non-aqueous electrolyte can scavenge decomposition products of lithium salt to maintain passivation of an SEI film during high-temperature storage. The non-aqueous electrolyte improves battery performance by improving self-discharge phenomenon caused by elution from a positive electrode and breakage of the SEI film at a negative electrode. The battery has improved initial efficiency by formation of an initial coating film to inhibit additional electrolyte decomposition.

8 Claims, 3 Drawing Sheets

(56) References Cited

U.S. PATENT DOCUMENTS

| | | |
|---|---|---|
| 2005/0064294 A1 | 3/2005 | Lim et al. |
| 2008/0194831 A1 | 8/2008 | Ignatyev et al. |
| 2012/0171576 A1 | 7/2012 | Tsai et al. |
| 2015/0010811 A1 | 1/2015 | Egorov et al. |
| 2019/0245244 A1 | 8/2019 | Lim et al. |
| 2020/0044287 A1 | 2/2020 | Kim et al. |
| 2020/0119397 A1 | 4/2020 | Schmidt |

FOREIGN PATENT DOCUMENTS

| | | | |
|---|---|---|---|
| CN | 105428703 A | 3/2016 | |
| CN | 109891654 A | 6/2019 | |
| DE | 102009055828 A1 | 7/2010 | |
| JP | H1055822 A | 2/1998 | |
| JP | 2002359002 A | 12/2002 | |
| JP | 2010197674 A | 9/2010 | |
| JP | 2014127354 A | 7/2014 | |
| JP | 2015018802 A | 1/2015 | |
| JP | 2015061046 A | 3/2015 | |
| JP | 2017191677 A | 10/2017 | |
| JP | 2019185979 A | 10/2019 | |
| KR | 20050029778 A | 3/2005 | |
| KR | 101287705 B1 | 7/2013 | |
| KR | 20130086733 A | 8/2013 | |
| KR | 2014039242 | 4/2014 | |
| KR | 20150019994 A | 2/2015 | |
| KR | 20190008100 A | 1/2019 | |
| KR | 20190127946 A | 11/2019 | |
| WO | 2006128563 A1 | 12/2006 | |
| WO | WO-2007126262 A1 * | 11/2007 | ........... C07C 233/91 |
| WO | 2012163490 A1 | 12/2012 | |

* cited by examiner

NON-AQUEOUS ELECTROLYTE SOLUTION FOR LITHIUM SECONDARY BATTERY AND LITHIUM SECONDARY BATTERY COMPRISING SAME

CROSS-REFERENCE TO RELATED APPLICATIONS

The present application is a national phase entry under 35 U.S.C. § 371 of International Application No. PCT/KR2021/002207, filed on Feb. 22, 2021, which claims priority from Korean Patent Application No. 10-2020-0021885, filed on Feb. 21, 2020, the disclosures of which are incorporated by reference herein.

TECHNICAL FIELD

The present disclosure relates to a non-aqueous electrolyte for a lithium secondary battery including a non-aqueous electrolyte additive having an excellent effect of scavenging decomposition products generated from a lithium salt and an excellent effect of forming an initial coating film, and a lithium secondary battery including the non-aqueous electrolyte and thus showing improved initial efficiency and self-discharge characteristics.

BACKGROUND ART

As information technology has been developed and personal IT devices and computer networks have been developed, and the overall social dependence on electric energy has been increased, there is a need for developing technologies for storing and utilizing electric energy efficiently.

Among the technologies developed for the above-mentioned purpose, the most suitable technology for various uses is a secondary battery-based technology. In the case of a secondary battery, it can be downsized to such a degree that it may be applied to personal IT devices, or the like, and can also be applied to electric vehicles, electric power storage systems, or the like. Therefore, such secondary batteries have been spotlighted. Among the secondary battery technologies, lithium-ion batteries which are battery systems having the theoretically highest energy density have been given many attentions and have been applied to various devices.

A lithium-ion battery does not apply lithium metal directly to an electrode, but includes a positive electrode including a lithium-containing transition metal oxide, a negative electrode including a carbonaceous material, such as graphite, capable of storing lithium, an electrolyte functioning as a medium for conducting lithium ions, and a separator.

Among such constitutional elements, the electrolyte has been known to affect the stability and safety of a battery significantly, and has been studied intensively.

The electrolyte for a lithium secondary battery includes a lithium salt, an organic solvent for dissolving the lithium salt, and functional additives, or the like. To improve the electrochemical properties of a battery, it is important to select such ingredients suitably. Typical lithium salts used currently include $LiPF_6$, $LiBF_4$, LiFSI (lithium fluorosulfonyl imide, $LiN(SO_2F)_2$), LiTFSI (lithium (bis)trifluoromethanesulfonyl imide, $LiN(SO_2CF_3)_2$), LiBOB (lithium bis (oxalate) borate, $LiB(C_2O_4)_2$), or the like. In addition, as the organic solvent, an ester-based organic solvent or an ether-based organic solvent is used.

Meanwhile, a lithium-ion battery has a disadvantage in that it undergoes an increase in resistance and a degradation of capacity during charge/discharge or storage at high temperature. Herein, one of the causes suggested for such problems is a side-reaction caused by the deterioration of an electrolyte at high temperature, particularly, the deterioration caused by the decomposition of a lithium salt. When the byproducts of a salt cause decomposition of coating films formed on the surfaces of a positive electrode and a negative electrode, after activation, there is a problem of degradation of the passivation abilities of the coating films, resulting in the problems of additional electrolyte decomposition and self-discharge caused thereby.

Particularly, in the case of a negative electrode among the electrode materials of a lithium-ion battery, a graphite-based negative electrode is used in most cases. In the case of graphite, it has an operating voltage of 0.3 V or less (vs. $Li/Li^+$), which is lower than the electrochemical stability window of an electrolyte used for a lithium-ion battery. Therefore, the currently used electrolyte is reduced and decomposed first. Then, the reduced and decomposed electrolyte products form a solid electrolyte interphase (SEI) film which allows permeation of lithium ions but inhibits additional decomposition of the electrolyte.

However, when the SEI film does not have a passivation ability sufficient for inhibiting additional decomposition of the electrolyte, the electrolyte is decomposed additionally during storage and the intercalated graphite is self-deintercalated, resulting in a decrease in the potential of a battery.

For example, acids, such as HF and $PF_5$, generated by thermal decomposition of $LiPF_6$, which is a lithium salt used widely in a lithium-ion battery, cause deterioration of a coating film or an electrode surface. Therefore, when the electrode surface is deteriorated, elution of a transition metal occurs at a positive electrode to cause an increase in resistance, loss of a redox center and a degradation of capacity. Moreover, in the case of eluted metal ions, they are electrodeposited on a negative electrode to cause consumption of electrons due to the electrodeposition of metals and additional electrolyte decomposition, resulting in an increase in irreversible capacity, a degradation of cell capacity, an increase in resistance and a self-discharge of a graphite negative electrode.

Therefore, recently, there have been suggested methods for introducing an electrolyte additive containing a functional group capable of facilitating reductive decomposition in an electrolyte, or for scavenging factors that may affect passivation abilities, such as lithium salt decomposition products (HF, $PF_5$, or the like) generated by heat or water, in order to inhibit an SEI film from being damaged at high temperature and to maintain passivation abilities.

DISCLOSURE

Technical Problem

The present disclosure is designed to solve the problems of the related art, and therefore the present disclosure is directed to providing a non-aqueous electrolyte additive which is a Lewis base compound, reacts rapidly with an acid and has an excellent effect of forming an SEI film and an excellent effect of scavenging decomposition products generated in a non-aqueous electrolyte, and a non-aqueous electrolyte for a lithium secondary battery including the same.

The present disclosure is also directed to providing a lithium secondary battery including the non-aqueous electrolyte additive and electrolyte, and thus showing improved initial efficiency and self-discharge characteristics.

Technical Solution

In one aspect of the present disclosure, there is provided a non-aqueous electrolyte for a lithium secondary battery.

According to the first embodiment of the present disclosure, there is provided a non-aqueous electrolyte for a lithium secondary battery, including a lithium salt, an organic solvent and a compound represented by the following Chemical Formula 1 as an additive:

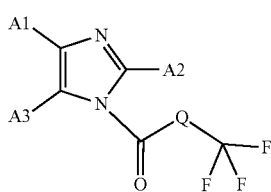

[Chemical Formula 1]

wherein Q is a single bond, or a substituted or non-substituted C1-C10 alkylene group, and each of A1, A2 and A3 independently represents H or a substituted or non-substituted C1-C10 alkyl group.

According to the second embodiment of the present disclosure, there is provided the non-aqueous electrolyte for a lithium secondary battery as defined in the first embodiment, wherein Q is a linear or branched alkylene, alkenylene or alkynylene group.

According to the third embodiment of the present disclosure, there is provided the non-aqueous electrolyte for a lithium secondary battery as defined in the second embodiment, wherein at least one hydrogen atom of Q is substituted with a halogen atom selected from Cl, F, Br and I.

According to the fourth embodiment of the present disclosure, there is provided the non-aqueous electrolyte for a lithium secondary battery as defined in any one of the first to the third embodiments, wherein the additive includes a compound represented by the following Chemical Formula 1a:

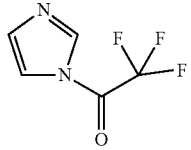

[Chemical Formula 1a]

According to the fifth embodiment of the present disclosure, there is provided the non-aqueous electrolyte for a lithium secondary battery as defined in any one of the first to the fourth embodiments, wherein the lithium salt includes $Li^+$, as a cation, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlI_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $PO_2F_2^-$, $SCN^-$ and $(CF_3CF_2SO_2)_2N^-$, as an anion.

According to the sixth embodiment of the present disclosure, there is provided the non-aqueous electrolyte for a lithium secondary battery as defined in any one of the first to the fifth embodiments, wherein the additive is used in an amount of 0.1-2 wt % based on 100 wt % of the non-aqueous electrolyte for a lithium secondary battery.

According to the seventh embodiment of the present disclosure, there is provided the non-aqueous electrolyte for a lithium secondary battery as defined in any one of the first to the sixth embodiments, wherein the additive is used in an amount of 0.3-1.5 wt % based on 100 wt % of the non-aqueous electrolyte for a lithium secondary battery.

According to the eighth embodiment of the present disclosure, there is provided a lithium secondary battery including a positive electrode, a negative electrode, a separator and a non-aqueous electrolyte for a lithium secondary battery, wherein the non-aqueous electrolyte is the same as defined in any one of the first to the seventh embodiments.

Advantageous Effects

According to the present disclosure, a Lewis base compound is used as an electrolyte additive, when preparing a non-aqueous electrolyte. Thus, it is possible to scavenge HF and $PF_5$ generated as decomposition products of lithium salt ($LiPF_6$) used frequently for a non-aqueous electrolyte, and thus to maintain the passivation ability of an SEI film during high-temperature storage. In addition, it is possible to obtain a lithium secondary battery having improved battery performance by using a non-aqueous electrolyte containing the Lewis base compound as an additive to reduce the self-discharge phenomenon caused by the elution from a positive electrode and the breakage of the SEI film at a negative electrode. Further, it is possible to provide a secondary battery having improved initial efficiency by forming an initial coating film well to inhibit additional electrolyte decomposition.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1A:
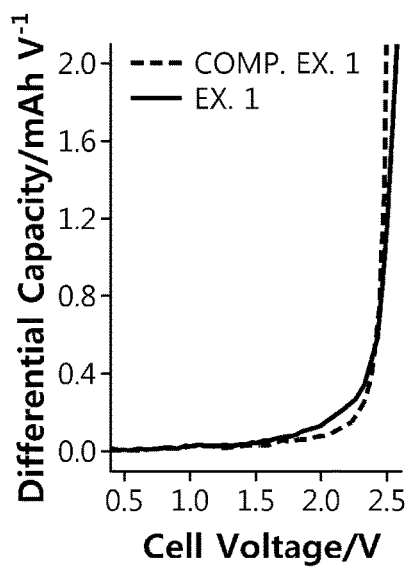
FIGS. 1A and 1B are graphs illustrating the differential capacity curve according to Test Example 1 of Example 1 and Comparative Example 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

During the initial charge/discharge of a lithium secondary battery, coating films having a passivation ability are formed on a positive electrode and a negative electrode, while a non-aqueous electrolyte is decomposed, thereby providing improved high-temperature storage characteristics. However, such coating films may be deteriorated by acids, such as HF and $PF_5$, generated by thermal decomposition of anions of a lithium salt, such as $LiPF_6$, used widely for a lithium-ion battery. Due to the attack of such acids, elution of transition metal elements occurs at the positive electrode to cause a change in surface structure and an increase in resistance on the electrode surface, and metal elements functioning as redox centers are lost to cause a decrease in theoretical capacity and a drop in capacity. In addition, in the case of such eluted transition metal ions, they are electrodeposited on the negative electrode reactive in a strong reduction potential region to cause consumption of electrons and breakage of the SEI film upon the electrodeposition. Therefore, the negative electrode surface is exposed to cause an increase in resistance of the negative electrode, resulting in additional electrolyte decomposition. As a result, there are problems of an increase in irreversible capacity and a continuous drop in cell capacity.

Under these circumstances, the present disclosure is directed to providing a non-aqueous electrolyte, which includes a Lewis base compound as a non-aqueous electrolyte additive to scavenge acids generated by lithium salt decomposition, and thus can prevent deterioration of an SEI film during high-temperature storage and elution of transition metals at a positive electrode and has an excellent coating film-forming ability on the surface of active materials, and to providing a lithium secondary battery including the non-aqueous electrolyte.

Non-Aqueous Electrolyte for Lithium Secondary Battery

Particularly, according to an embodiment of the present disclosure, there is provided a non-aqueous electrolyte for a lithium secondary battery, including a lithium salt, an organic solvent and a compound represented by the following Chemical Formula 1 as an additive:

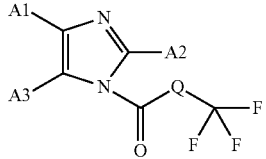

[Chemical Formula 1]

wherein Q may be a single bond, or a substituted or non-substituted C1-C10 alkylene group. According to an embodiment of the present disclosure, Q may be a linear or branched alkylene, alkenylene or alkynylene group. Meanwhile, at least one hydrogen atom of Q may be substituted with a halogen atom selected from Cl, F, Br and I. Meanwhile, according to an embodiment of the present disclosure, each of A1, A2 and A3 may independently represent H or a substituted or non-substituted C1-C10 alkyl group.

(1) Lithium Salt

First, in the non-aqueous electrolyte for a lithium secondary battery according to an embodiment of the present disclosure, the lithium salt may be any lithium salt used conventionally for preparing an electrolyte for a lithium secondary battery with no particular limitation. For example, the lithium salt includes $Li^+$, as a cation, and at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $PO_2F_2^-$, $SCN^-$ and $(CF_3CF_2SO_2)_2N^-$, as an anion. Particularly, the lithium salt may be at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiPO_2F_2$, $LiB_{10}Cl_{10}$, LiBOB ($LiB(C_2O_4)_2$), $LiCF_3SO_3$, LiTFSI ($LiN(SO_2CF_3)_2$), LiFSI ($LiN(SO_2F)_2$), $LiCH_3SO_3$, $LiCF_3CO_2$, $LiCH_3CO_2$ and LiBETI ($LiN(SO_2CF_2CF_3)_2$. More particularly, the lithium salt may include any one selected from the group consisting of $LiPO_2F_2$, $LiBF_4$, $LiClO_4$, $LiPF_6$, LiBOB ($LiB(C_2O_4)_2$), $LiCF_3SO_3$, LiTFSI ($LiN(SO_2CF_3)_2$), LiFSI ($LiN(SO_2F)_2$) and LiBETI ($LiN(SO_2CF_2CF_3)_2$, or a mixture of two or more of them.

The lithium salt may be used in an adequate amount within a generally applicable range. However, the lithium salt may be used at a concentration of 0.8-4.0 M, particularly 1.0-3.0 M, in the electrolyte in order to obtain an optimized effect of forming a coating film for preventing corrosion on the electrode surface.

When the lithium salt is used at a concentration of less than 0.8 M, it is not possible to obtain a sufficient effect of improving the low-temperature output of a lithium secondary battery and improving the cycle characteristics of a lithium secondary battery during high-temperature storage. When the lithium salt is used at a concentration higher than 4.0 M, the non-aqueous electrolyte has increased viscosity to cause degradation of wettability with the electrolyte.

(2) Organic Solvent

In the non-aqueous electrolyte for a lithium secondary battery according to the present disclosure, the organic solvent may include a cyclic carbonate-based organic solvent, a linear carbonate-based organic solvent or a mixed organic solvent thereof.

The cyclic carbonate-based organic solvent is a high-viscosity organic solvent and an organic solvent capable of dissociating the lithium salt well in the electrolyte. Particular examples of the cyclic carbonate-based organic solvent may include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate and vinylene carbonate. Particularly, the cyclic carbonate-based organic solvent may include ethylene carbonate (EC).

In addition, the linear carbonate-based organic solvent is an organic solvent having low viscosity and a low dielectric constant, and typical examples thereof may include at least one organic solvent selected from the group consisting of dimethyl carbonate (DMC), diethyl carbonate (DEC), dipropyl carbonate, ethyl methyl carbonate (EMC), methyl propyl carbonate and ethyl propyl carbonate. Particularly, the linear carbonate-based organic solvent may include ethyl methyl carbonate (EMC).

Further, in order to obtain an electrolyte having high ion conductivity, the organic solvent may further include at least one ester-based organic solvent selected from the group consisting of a linear ester-based organic solvent and a cyclic ester-based organic solvent in combination with at least one carbonate-based organic solvent selected from the group consisting of the cyclic carbonate-based organic solvent and the linear carbonate-based organic solvent.

Particular examples of the linear ester-based organic solvent may include at least one organic solvent selected from the group consisting of methyl acetate, ethyl acetate, propyl acetate, methyl propionate, ethyl propionate, propyl propionate and butyl propionate.

In addition, the cyclic ester-based organic solvent may include at least one organic solvent selected from the group consisting of γ-butyrolactone, γ-valerolactone, γ-caprolactone, σ-valerolactone and ε-caprolactone.

Meanwhile, if necessary, the organic solvent may further include any organic solvent used conventionally for an electrolyte for a lithium secondary battery with no particular limitation. For example, the organic solvent may further include at least one organic solvent selected from ether-based organic solvents, amide-based organic solvents and nitrile-based organic solvents.

(3) Additive

The non-aqueous electrolyte for a lithium secondary battery according to the present disclosure may include a compound represented by the following Chemical Formula 1:

[Chemical Formula 1]

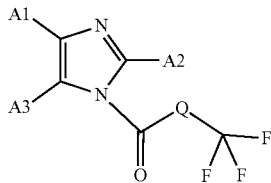

wherein Q may be a single bond, or a substituted or non-substituted C1-C10 alkylene group. According to an embodiment of the present disclosure, Q may be a linear or branched alkylene, alkenylene or alkynylene group. Meanwhile, at least one hydrogen atom of Q may be substituted with a halogen atom selected from Cl, F, Br and I. Meanwhile, according to an embodiment of the present disclosure, each of A1, A2 and A3 may independently represent H or a substituted or non-substituted C1-C10 alkyl group.

A typical example of the compound represented by Chemical Formula 1 may be a compound represented by the following Chemical Formula 1a:

[Chemical Formula 1a]

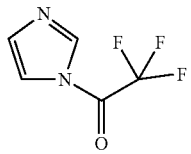

According to an embodiment of the present disclosure, the compound represented by Chemical Formula 1 may be used in an amount of 0.1-2 wt % based on 100 wt % of the non-aqueous electrolyte for a lithium secondary battery. For example, within the above-defined range, the compound represented by Chemical Formula 1 may be used in an amount of 0.1 wt % or more, 0.2 wt % or more, 0.3 wt % or more, or 0.5 wt % or more. In addition, within the above-defined range, the compound represented by Chemical Formula 1 may be used in an amount of 1.7 wt % or less, 1.5 wt % or less, or 1.2 wt % or less. In Chemical Formula 1a, hydrogen atoms (H) are bound to the carbon atoms in the cyclic compound, and the presence of such hydrogen atoms is apparent to those skilled in the art.

When the compound represented by Chemical Formula 1 is used within the above-defined range, it is possible to obtain a secondary battery having improved overall performance. For example, when the content of the compound represented by Chemical Formula 1 is less than 0.1 wt %, HF or $PF_5$ may be scavenged at the initial stage, but the scavenging effect becomes insignificant as time passes, and the effect of forming an initial SEI film derived from the additive may be degraded significantly. In addition, when the compound represented by Chemical Formula 1 is larger than 2.0 wt %, side-reactions occur due to an excessive amount of additive and byproducts are generated to cause an increase in the resistance of a secondary battery during high-temperature storage.

Therefore, when the compound represented by Chemical Formula 1 is used in an amount of 0.1-2 wt %, particularly 0.1-1.7 wt %, and more particularly 0.3-1.5 wt %, it is possible to scavenge acids, such as HF and $PF_5$ generated as lithium salt decomposition products, more effectively, while inhibiting the disadvantages, such as side reactions, a degradation of capacity and an increase in resistance, to the highest degree.

According to the present disclosure, the compound represented by Chemical Formula 1 and used as an electrolyte additive is a Lewis base compound containing an imidazole functional group. Therefore, the compound can easily scavenge Lewis acids (such as HF or $PF_5$) generated due to the decomposition of a lithium salt. As a result, it is possible to inhibit deterioration behavior resulting from the chemical reactions of the coating film on the surface of a positive electrode or a negative electrode, caused by Lewis acids, and thus to prevent additional electrolyte decomposition in a battery, caused by the breakage of the coating film and to reduce the self-discharge of a secondary battery, thereby providing improved high-temperature storage characteristics. In addition, since the compound includes a C=O functional group, it shows high solubility to a group of solvents used generally for a lithium secondary battery and can be bound easily with a Li salt, and thus provides an excellent ability of forming a solid electrolyte interphase (SEI) film which is a Li-organic/inorganic composite capable of protecting the surface of a negative electrode upon the reductive decomposition.

(4) Supplementary Additives

In addition, the non-aqueous electrolyte for a lithium secondary battery according to the present disclosure may further include supplementary additives, if necessary, in order to prevent a decomposition of the non-aqueous electrolyte and a collapse of the negative electrode under a high-output environment, or to improve low-temperature high-rate discharge characteristics, high-temperature stability, overcharge-preventing effect, battery swelling-inhibiting effect at high temperature, or the like.

Typical examples of such supplementary additives may include at least one supplementary additive selected from the group consisting of cyclic carbonate compounds, halogen-substituted carbonate compounds, sultone-based compounds, sulfate-based compounds, phosphate-based compounds, borate-based compounds, nitrile-based compounds, benzene-based compounds, amine-based compounds, silane-based compounds and lithium salt-based compounds.

The cyclic carbonate-based compounds may include vinylene carbonate (VC) or vinylethylene carbonate. The halogen-substituted carbonate-based compounds may include fluoroethylene carbonate (FEC).

The sulfone-based compounds may include at least one compound selected from the group consisting of 1,3-propane sultone (PS), 1,4-butane sulfone, ethene sultone, 1,3-propene sultone (PRS), 1,4-butene sultone and 1-methyl-1, 3-propene sultone.

The sulfate-based compounds may include ethylene sulfate (Esa), trimethylene sulfate (TMS), or methyl trimethylene sulfate (MTMS).

The phosphate-based compounds may include at least one compound selected from the group consisting of lithium difluoro(bisoxalato)phosphate, lithium difluorophosphate ($LiPO_2F_2$), tris(trimethylsilyl) phosphate, tris(trimethylsilyl) phosphite, tris(2,2,2-trifluoroethyl) phosphate and tris(trifluoroethyl) phosphite.

The borate-based compounds may include tetraphenyl borate and lithium oxalyl difluoroborate.

The nitrile-based compounds may include at least one compound selected from the group consisting of succinonitrile, adiponitrile, acetonitrile, propionitrile, butyronitrile, valeronitrile, caprylonitrile, heptane nitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenyl acetonitrile, 4-fluorophenylacetonitrile, and propargyl 1H-imidazole-1-carboxylate.

The benzene-based compounds may include fluorobenzene, the amine-based compounds may include triethanolamine or ethylenediamine, and the silane-based compounds may include tetravinylsilane.

The lithium salt-based compounds may include compounds different from the lithium salt contained in the non-aqueous electrolyte, and particularly, at least one compound selected from the group consisting of $LiPO_2F_2$, LiODFB, LiBOB (lithium bisoxalatoborate, $LiB(C_2O_4)_2$) and $LiBF_4$.

When the non-aqueous electrolyte for a lithium secondary battery includes vinylene carbonate, vinylethylene carbonate or succinonitrile, among the supplementary additives, it is possible to form a more rigid SEI film on the surface of the negative electrode during the initial activation of a secondary battery.

When using $LiBF_4$, it is possible to inhibit generation of gases caused by decomposition of the electrolyte during high-temperature storage, and thus to improve the high-temperature stability of a secondary battery.

Meanwhile, two or more of the supplementary additives may be used in combination, and the content of the supplementary additives may be 0.01-50 wt %, particularly 0.01-20 wt %, based on the total weight of the non-aqueous electrolyte. When the content of the supplementary additives is less than 0.01 wt %, it is not possible to obtain sufficient effects of improving the low-temperature output, high-temperature storage characteristics and high-temperature life characteristics of a battery. When the content of the supplementary additives is larger than 50 wt %, excessive side reactions may occur during the charge/discharge of a battery due to an excessive amount of additives. Particularly, when the additives for forming an SEI film are added in an excessive amount, they cannot be decomposed sufficiently at high temperature, resulting in formation of unreacted materials in the electrolyte at room temperature or precipitation thereof. In this case, side-reactions may occur to cause degradation of the life or resistance characteristics of a secondary battery.

Lithium Secondary Battery

In another aspect of the present disclosure, there is provided a lithium secondary battery including the non-aqueous electrolyte for a lithium secondary battery according to the present disclosure.

Meanwhile, the lithium secondary battery according to the present disclosure may be obtained by forming an electrode assembly including a positive electrode, a negative electrode and a separator interposed between the positive electrode and the negative electrode, stacked successively therein, introducing the electrode assembly to a battery casing, and injecting the non-aqueous electrolyte according to the present disclosure.

The method for manufacturing the lithium secondary battery according to the present disclosure may be any method known to those skilled in the art, and a particular embodiment of the method will be explained hereinafter.

(1) Positive Electrode

The positive electrode may be obtained by coating a positive electrode slurry including a positive electrode active material, a binder, a conductive material and a solvent onto a positive electrode current collector, followed by drying and pressing.

The positive electrode current collector is not particularly limited, as long as it causes no chemical change in the corresponding battery and has conductivity. Particular examples of the positive electrode current collector may include stainless steel, aluminum, nickel, titanium, baked carbon, or aluminum or stainless steel surface-treated with carbon, nickel, titanium, silver, etc., or the like.

The positive electrode active material is a compound capable of reversible lithium intercalation/deintercalation, and particular examples thereof include lithium composite metal oxides containing at least one metal, such as cobalt, manganese, nickel or aluminum, and lithium. More particularly, the lithium composite metal oxides may include lithium-manganese oxides (e.g. $LiMnO_2$, $LiMn_2O_4$, etc.), lithium-cobalt oxides (e.g., $LiCoO_2$, etc.), lithium-nickel oxides (e.g., $LiNiO_2$, etc.), lithium-nickel-manganese oxides (e.g., $LiNi_{1-Y}Mn_YO_2$ (wherein $0<Y<1$), $LiMn_{2-Z}Ni_ZO_4$ (wherein $0<Z<2$)), lithium-nickel-cobalt oxides (e.g., $LiNi_{1-Y1}Co_{Y1}O_2$ (wherein $0<Y1<1$)), lithium-manganese-cobalt oxides (e.g., $LiCo_{1-Y2}Mn_{Y2}O_2$ (wherein $0<Y2<1$), $LiMn_{2-z1}Co_{z1}O_4$ (wherein $0<Z1<2$)), lithium-nickel-manganese-cobalt oxides (e.g., $Li(Ni_pCo_qMn_{r1})O_2$ ($0<p<1, 0<q<1, 0<r1<1, p+q+r1=1$) or $Li(Ni_{p1}Co_{q1}Mn_{r2})O_4$ ($0<p1<2, 0<q1<2, 0<r2<2, p1+q1+r2=2$)), lithium-nickel-cobalt-transition metal (M) oxides (e.g., $Li(Ni_{p2}Co_{q2}Mn_{r3}M_{S2})O_2$ (wherein M is selected from the group consisting of Al, Fe, V, Cr, Ti, Ta, Mg and Mo, and each of p2, q2, r3 and s2 represents the atomic proportion of each element satisfying $0<p2<1, 0<q2<1, 0<r3<1, 0<s2<1$, and $p2+q2+r3+s2=1$)), or the like, and any one compound or two or more compounds of them may be used. Particularly, the lithium composite metal oxides may include $LiCoO_2$, $LiMnO_2$, $LiNiO_2$, lithium nickel manganese cobalt oxides (e.g. $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, or the like), or lithium nickel cobalt aluminum oxides (e.g., $Li(Ni_{0.8}Co_{0.15}Al_{0.05})O_2$, etc.) with a view to improvement of the capacity characteristics and stability of a battery. In addition, considering the significance of the improvement depending on the types of the constitutional elements forming the lithium composite metal oxides and the mixing ratios thereof, the lithium composite metal oxides may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, Li(Ni$_{0.8}$Mn$_{0.1}$Co$_{0.1}$)O$_2$, or the like, and any one compound or two or more compounds of them may be used.

The positive electrode active material may be used in an amount of 80-99 wt %, particularly 90-99 wt %, based on the total weight of the solid content in the positive electrode slurry. When the positive electrode active material is used in an amount of 80 wt % or less, energy density is decreased to cause degradation of capacity.

The binder is an ingredient which assists binding between an active material and a conductive material and binding to a current collector. In general, the binder may be added in an amount of 1-30 wt % based on the total weight of the solid content in the positive electrode slurry. Particular examples of the binder include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer, styrene-butadiene rubber, fluoro-rubber, various copolymers, or the like.

In addition, the conductive material is not particularly limited, as long as it causes no chemical change in the corresponding battery and has conductivity. The conductive material may be added in an amount of 1-20 wt % based on the total weight of the solid content in the positive electrode slurry.

Typical examples of the conductive material include: carbon powder, such as carbon black, acetylene black, ketjen black, channel black, furnace black, lamp black or thermal black; graphite powder, such as natural graphite, artificial graphite or graphite having a well-developed crystal structure; conductive fibers, such as carbon fibers or metallic fibers; metal powder, such as carbon fluoride powder, aluminum powder or nickel powder; conductive whisker, such as zinc oxide or potassium titanate; conductive metal oxide, such as titanium oxide; and conductive materials, such as polyphenylene derivatives.

Further, the solvent may include an organic solvent, such as N-methyl-2-pyrrolidone (NMP), and may be used in such an amount that the solvent provides a desired level of viscosity when the positive electrode active material and optionally the binder and the conductive material are incorporated thereto. For example, the solvent may provide a solid content, including the positive electrode active material and optionally the binder and the conductive material, in the positive electrode slurry of 10-60 wt %, preferably 20-50 wt %.

(2) Negative Electrode

The negative electrode may be obtained by coating a negative electrode slurry including a negative electrode active material, a binder, a conductive material and a solvent onto a negative electrode current collector, followed by drying and pressing.

The negative electrode current collector generally has a thickness of 3-500 μm. The negative electrode current collector is not particularly limited, as long as it has high conductivity while not causing any chemical change in the corresponding battery. Particular examples of the negative electrode current collector include copper, stainless steel, aluminum, nickel, titanium, baked carbon, or copper or stainless steel surface-treated with carbon, nickel, titanium, silver, etc., aluminum-cadmium alloy, or the like. In addition, similarly to the positive electrode current collector, the negative electrode current collector may have fine surface irregularities formed on the surface thereof to increase the adhesion of a negative electrode active material, and may have various shapes, such as a film, a sheet, a foil, a net, a porous body, a foam or non-woven web body, or the like.

In addition, the negative electrode active material may include at least one selected from the group consisting of a lithium metal, a carbonaceous material capable of reversible lithium-ion intercalation/deintercalation, a metal or alloy of metal with lithium, a metal composite oxide, a material capable of lithium doping/dedoping, and a transition metal oxide.

The carbonaceous material capable of reversible lithium-ion intercalation/deintercalation may include any carbonaceous negative electrode active material used currently in a lithium-ion secondary battery with no particular limitation. Typical examples of the carbonaceous material include crystalline carbon, amorphous carbon or a mixture thereof. Particular examples of the crystalline carbon include graphite, such as amorphous, sheet-like, flake-like, spherical or fibrous natural graphite or artificial graphite, and particular examples of the amorphous carbon include soft carbon (low-temperature baked carbon) or hard carbon, mesophase pitch carbide, baked cokes, or the like.

Particular examples of the metal or alloy of metal with lithium include a metal selected from the group consisting of Cu, Ni, Na, K, Rb, Cs, Fr, Be, Mg, Ca, Sr, Si, Sb, Pb, In, Zn, Ba, Ra, Ge, Al and Sn, or an alloy of such a metal with lithium.

The metal composite oxide that may be used is selected from the group consisting of PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, Bi$_2$O$_5$, Li$_x$Fe$_2$O$_3$ (0≤x≤1), Li$_x$WO$_2$ (0≤x≤1), and Sn$_x$Me$_{1-x}$Me'$_y$O$_z$ (wherein Me is Mn, Fe, Pb, Ge; Me' is Al, B, P, Si, element of Group 1, 2 or 3 in the Periodic Table, halogen; and 0<x≤1; 1≤y≤3; and 1≤z≤8).

The material capable of lithium doping/dedoping may include Si, SiO$_x$ (0<x<2), Si—Y alloy (wherein Y is an element selected from the group consisting of alkali metals, alkaline earth metals, Group 13 elements, Group 14 elements, transition metals, rare earth metal elements and combinations thereof, except Si), Sn, SnO$_2$, Sn—Y (wherein Y is an element selected from the group consisting of alkali metals, alkaline earth metals, Group 13 elements, Group 14 elements, transition metals, rare earth metal elements and combinations thereof, except Sn), or the like. At least one of such materials may be used in combination with SiO$_2$. Element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include lithium-containing titanium composite oxide (LTO), vanadium oxide, lithium vanadium oxide, or the like.

The negative electrode active material may be used in an amount of 80-99 wt % based on the total weight of the solid content in the negative electrode slurry.

The binder is an ingredient which assists binding among a conductive material, an active material and a current collector. In general, the binder may be added in an amount of 1-30 wt % based on the total weight of the solid content in the negative electrode slurry. Particular examples of the binder include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene monomer, styrene-butadiene rubber, fluoro-rubber, various copolymers thereof, or the like.

The conductive material is an ingredient for further improving the conductivity of the negative electrode active material, and may be added in an amount of 1-20 wt % based on the total weight of the solid content of the negative electrode slurry. The conductive material is not particularly limited, as long as it causes no chemical change in the corresponding battery and has conductivity. Particular examples of the conductive material include: carbon powder, such as carbon black, acetylene black, ketjen black, channel black, furnace black, lamp black or thermal black; graphite powder, such as natural graphite, artificial graphite or graphite having a well-developed crystal structure; conductive fibers, such as carbon fibers or metallic fibers; metal powder, such as carbon fluoride powder, aluminum powder or nickel powder; conductive whisker, such as zinc oxide or potassium titanate; conductive metal oxide, such as titanium oxide; and conductive materials, such as polyphenylene derivatives.

The solvent may include water or an organic solvent, such as NMP, alcohol, or the like, and may be used in such an amount that the solvent provides a desired level of viscosity when the negative electrode active material and optionally the binder and the conductive material are incorporated thereto. For example, the solvent may provide a solid content, including the negative electrode active material and optionally the binder and the conductive material, in the negative electrode slurry of 50-75 wt %, preferably 50-65 wt %.

(3) Separator

The separator contained in the lithium secondary battery according to the present disclosure may include a conventional porous polymer film, such as a porous polymer film made of a polyolefin-based polymer, including ethylene homopolymer, propylene homopolymer, ethylene/butene copolymer, ethylene/hexene copolymer or ethylene/methacrylate copolymer, and such porous polymer films may be used alone or in the form of a laminate. Otherwise, a conventional porous non-woven web, such as a non-woven web made of high-melting point glass fibers, polyethylene terephthalate fibers, or the like, may be used with no particular limitation.

There is no particular limitation in the appearance of the lithium secondary battery according to an embodiment of the present disclosure. For example, the lithium secondary battery may have a cylindrical shape using a can, a prismatic shape, a pouch-like shape or a coin-like shape.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1. Preparation of Non-Aqueous Electrolyte

To 98.5 g of an organic solvent (ethylene carbonate (EC):ethyl methyl carbonate (EMC)=3:7, volume ratio) containing 1.0 M $LiPF_6$ dissolved therein, 0.5 g of the compound represented by the above Chemical Formula 1a and 1.0 g of ethylene sulfate were added to obtain the non-aqueous electrolyte according to the present disclosure.

2. Manufacture of Electrode Assembly

First, a positive electrode active material ($LiNi_{0.8}Co_{0.1}Mn_{0.1}O_2$), carbon black as a conductive material and polyvinylidene fluoride (PVDF) as a binder were added to N-methyl-2-pyrrolidone (NMP) as a solvent at a weight ratio of 97.5:1:1.5 to obtain positive electrode mixture slurry (solid content: 50 wt %). The positive electrode mixture slurry was applied to and dried on aluminum (Al) foil having a thickness of 12 μm as a positive electrode current collector, followed by roll pressing, to obtain a positive electrode.

A negative electrode active material (SiO:graphite=5.5:94.5, weight ratio), SBR-CMC as a binder and carbon black as a conductive material were added to water at a weight ratio of 95:3.5:1.5 to obtain negative electrode mixture slurry (solid content: 60 wt %). The negative electrode mixture slurry was applied to and dried on copper (Cu) foil having a thickness of 6 μm as a negative electrode current collector, followed by roll pressing, to obtain a negative electrode.

The positive electrode, a polyolefin-based porous separator coated with inorganic particles ($Al_2O_3$) and the negative electrode were stacked successively to obtain an electrode assembly.

3. Manufacture of Secondary Battery

The resultant electrode assembly was received in a battery casing, and the composition for a non-aqueous electrolyte was injected thereto to obtain a pouch-like lithium secondary battery.

Comparative Example 1

To 99.0 g of an organic solvent (ethylene carbonate (EC):ethyl methyl carbonate (EMC)=3:7, volume ratio) containing 1.0 M $LiPF_6$ dissolved therein, 1.0 g of ethylene sulfate was added to obtain a non-aqueous electrolyte. A battery was obtained in the same manner as Example 1, except that the resultant non-aqueous electrolyte was used.

Test Examples

Test Example 1: Evaluation of Differential Capacity Curve

Figure 1B:
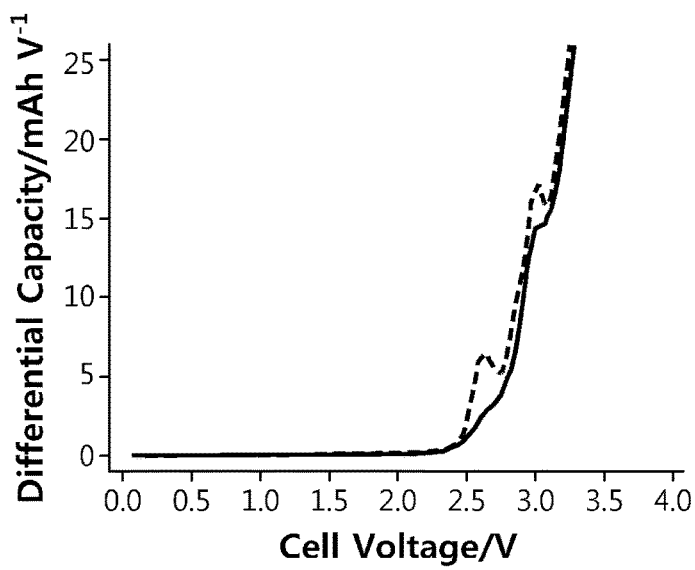

Each of the secondary batteries according to Example 1 and Comparative Example 1 was activated by charging the battery at 0.1 C in a constant current-constant voltage (CC-CV) mode to a SOC of 30%, and then degassing was carried out. FIGS. 1A and 1B show a differential capacity curve obtained by primary differentiation of the capacity-voltage curve obtained upon the activation.

Referring to FIGS. 1A and 1B, it can be seen that the lithium secondary battery of Example 1 including the non-aqueous electrolyte containing the additive according to the present disclosure shows a decomposition peak, where the initial electrolyte decomposition occurs (FIG. 1A), and peaks caused by additional electrolyte decomposition at a higher voltage after the initial decomposition are significantly reduced (FIG. 1B). Therefore, it can be seen that the electrolyte according to Example 1 forms a coating film at the initial stage more efficiently as compared to the electrolyte according to Comparative Example 1.

Test Example 2: Evaluation of Initial Coulombic Efficiency

Each of the secondary batteries according to Example 1 and Comparative Example 1 was activated by charging the battery at 0.1 C in a constant current-constant voltage (CC-CV) mode to a SOC of 30%, and then degassing was carried out. Then, the first full charge-full discharge capacity was measured by using PNE-0506 charger (available from PNE Solution Co., Ltd., 5 V, 6 A), and the initial coulombic efficiency (discharge capacity/charge capacity) was determined from the charge capacity and discharge capacity obtained therefrom.

Figure 2:
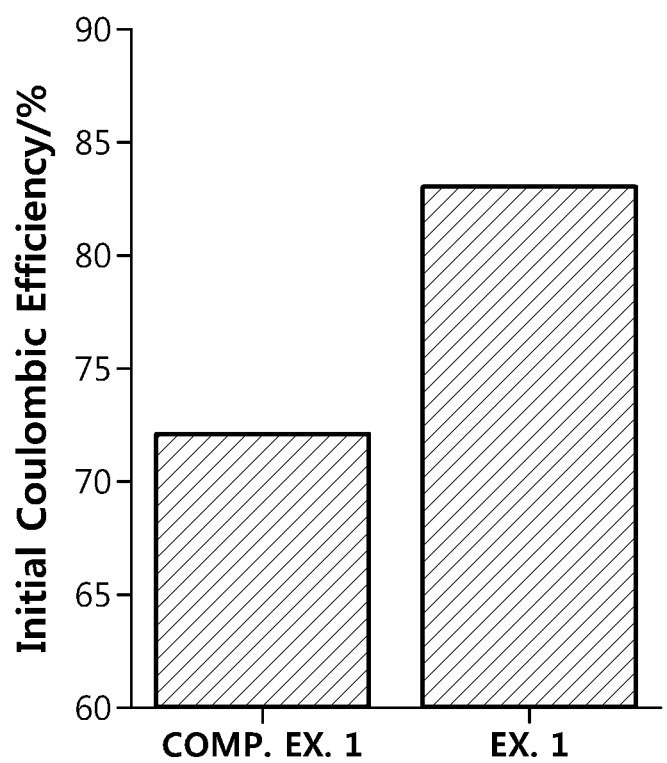
FIG. 2 shows the results of the initial efficiency during activation according to Test Example 2 of Example 1 and Comparative Example 1.

Referring to FIG. 2, it can be seen that the lithium secondary battery of Example 1 including the non-aqueous electrolyte containing the additive according to the present disclosure effectively inhibits decomposition of the electrolyte at the initial stage, and thus provides a relatively high initial efficiency. This means that there is low energy loss generated during the manufacture of the battery.

Test Example 3: Evaluation of Drop in OCV

Each of the secondary batteries according to Example 1 and Comparative Example 1 was activated by charging the battery at 0.1 C in a constant current-constant voltage (CC-CV) mode to a SOC of 30%, and then degassing was carried out. Then, the first full charge-full discharge capacity was measured by using PNE-0506 charger (available from PNE Solution Co., Ltd., 5 V, 6 A), and the initial coulombic efficiency (discharge capacity/charge capacity) was determined from the charge capacity and discharge capacity obtained therefrom. After that, three charge/discharge cycles were carried out, and then the battery was fully charged to determine the degree of self-discharge of the battery.

Figure 3:
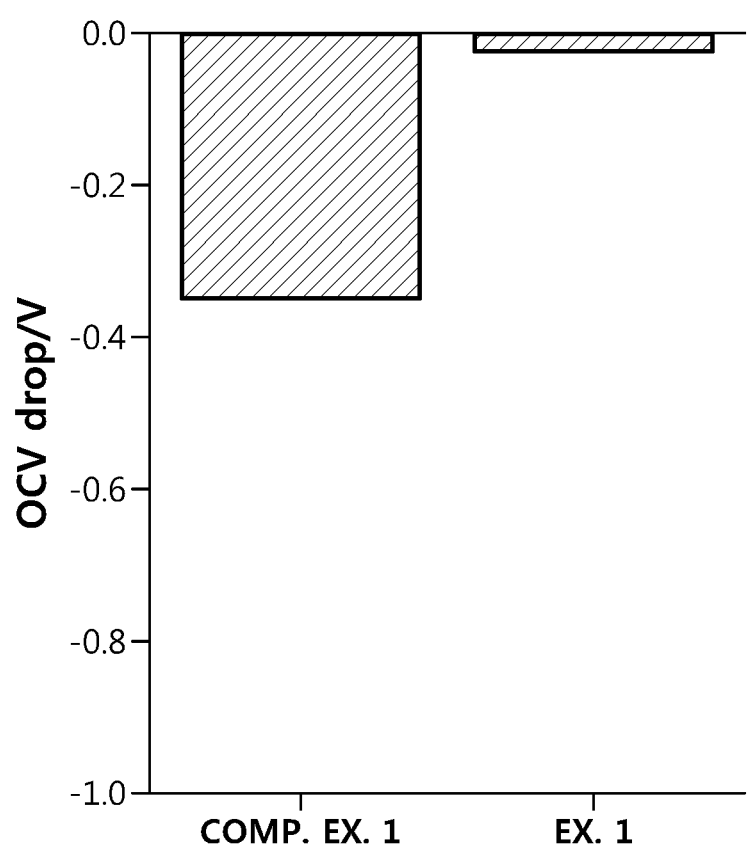
FIG. 3 shows the results of a drop in initial open-circuit-voltage (OCV) according to Test Example 3 of Example 1 and Comparative Example 1.

Referring to FIG. 3, it can be seen that since the lithium secondary battery of Example 1 including the electrolyte containing the additive according to the present disclosure forms a coating film at the initial stage more efficiently as compared to the secondary battery according to Comparative Example 1, it significantly inhibits a drop in OCV caused by the self-discharge of the active material.

Example 2

1. Preparation of Non-Aqueous Electrolyte

Ethylene carbonate (EC) and ethyl methyl carbonate (EMC) were mixed at a volume ratio of 30:70 to prepare a non-aqueous organic solvent, and LiPF$_6$ was dissolved therein to a concentration of 1.0 M. Then, the compound represented by the above Chemical Formula 1a was added thereto in an amount of 0.2 wt % based on the total weight of the non-aqueous electrolyte.

Besides the additive, 0.5 wt % of vinylene carbonate (VC), 0.5 wt % of 1,3-propane sulfone (PS), 1 wt % of ethylene sulfate (Esa), 2 wt % of lithium difluorophosphate (LiDFP, LiPO$_2$F$_2$), 0.2 wt % of 1,3-propene sulfone, and 0.1 wt % of propargyl 1H-imidazole-1-carboxylate (HS02, CAS 83395-38-4) were added to obtain a non-aqueous electrolyte.

2. Manufacture of Electrodes

First, a positive electrode active material (Li(Ni$_{0.6}$Mn$_{0.2}$Co$_{0.2}$)O$_2$), a conductive material (carbon black) and a binder (polyvinylidene fluoride) were added to N-methyl-2-pyrrolidone (NMP) as a solvent at a weight ratio of 90:5:5 to obtain positive electrode mixture slurry (solid content: 50 wt %). The positive electrode mixture slurry was applied to and dried on aluminum (Al) foil having a thickness of 100 μm as a positive electrode current collector, followed by roll pressing, to obtain a positive electrode.

A negative electrode active material (artificial graphite), a binder (PVDF) and a conductive material (carbon black) were added to NMP as a solvent at a weight ratio of 95:2:3 to obtain negative electrode mixture slurry (solid content: 60 wt %). The negative electrode mixture slurry was applied to and dried on copper (Cu) foil having a thickness of 90 μm as a negative electrode current collector, followed by roll pressing, to obtain a negative electrode.

3. Manufacture of Secondary Battery

The resultant positive electrode and negative electrode were stacked successively with a polyethylene porous film to form an electrode assembly, the electrode assembly was received in a battery casing, the non-aqueous electrolyte was injected thereto, and the battery casing was sealed to obtain a lithium secondary battery (battery capacity 2100 mAh).

Example 3

A lithium secondary battery was obtained in the same manner as Example 2, except that the compound represented by Chemical Formula 1a was added in an amount of 0.5 wt %, when preparing a non-aqueous electrolyte.

Comparative Example 2

A lithium secondary battery was obtained in the same manner as Example 2, except that the compound represented by Chemical Formula 1a was not added, when preparing a non-aqueous electrolyte.

Test Example 4: Evaluation of Capacity Retention After High-Temperature (60° C.) Storage Each of the lithium secondary batteries according to Examples 2 and 3 and Comparative Example 2 was subjected to formation at a current of 210 mA (0.1 C rate), and the battery was degassed (degassing process). Then, the battery was charged in a constant-current/constant-voltage (CC/CV) mode of 0.33 C/4.2 V under the condition of 4.2 V/0.05 C and discharged in a constant-current mode of 0.33 C/2.5 V, at 25° C. Herein, the discharge capacity measured by using PNE-0506 charger (available from PNE Solution Co., Ltd., 5 V, 6 A), after the assemblage of the cell and before the high-temperature storage, was defined as initial discharge capacity.

Then, each secondary battery was set to a charged state of SOC 100% and stored at 60° C. for 12 weeks.

After that, each secondary battery was charged in a constant-current/constant-voltage (CC/CV) mode of 0.33 C/4.2 V under the condition of 4.2 V/0.05 C and discharged in a constant-current mode of 0.33 C/2.5 V, at 25° C., and then the discharge capacity was measured by using PNE-0506 charger (available from PNE Solution Co., Ltd., 5 V, 6 A). The capacity measured herein was defined as discharge capacity after high-temperature storage.

The resultant initial discharge capacity and discharge capacity after high-temperature storage were put into the following Formula (1) to determine the capacity retention. The results are shown in the following Table 1.

Capacity retention (%)=(Discharge capacity after high-temperature storage/Initial discharge capacity)×100    Formula (1):

Test Example 5: Evaluation of Increase in Resistance After High-Temperature (60° C.) Storage Each of the lithium secondary batteries according to Examples 2 and 3 and Comparative Example 2 was subjected to formation at a current of 210 mA (0.1 C rate), and the battery was degassed (degassing process). Then, the battery was charged in a constant-current/constant-voltage (CC/CV) mode of 0.33 C/4.2 V under the condition of 4.2

V/0.05 C and discharged at 0.33 C at 25° C. so that the battery might be set to a charged state of SOC 50%. After that, a drop in voltage appearing under the application of a discharge pulse at a constant current of 2.5 C for 30 seconds was measured by using PNE-0506 charger (available from PNE Solution Co., Ltd., 5 V, 6 A) to obtain the initial resistance value. Then, the battery was charged in a constant-current/constant-voltage (CC/CV) mode of 0.33 C/4.2 V under the condition of 4.2 V/0.05 C within a range of operating voltage of 2.5-4.2 V so that the battery might be set to a charged state of SOC 100%.

After that, each secondary battery was allowed to stand at 60° C. for 12 weeks.

Then, a drop in voltage appearing during the application of a discharge pulse at a constant current of 2.5 C for 30 seconds was measured by using PNE-0506 charger (available from PNE Solution Co., Ltd., 5 V, 6 A), to obtain the resistance after high-temperature storage, after each battery was charged in a constant-current/constant-voltage (CC/CV) mode of 0.33 C/4.2 V under the condition of 4.2 V/0.05 C and discharged at 0.33 C so that the battery might be set to a charged state of SOC 50%.

The following Formula (2) was used to calculate an increase in resistance (%) for each secondary battery from the ratio of resistance increased after the high-temperature storage based on the initial resistance. The results are shown in the following Table 1.

Increase in resistance (%)={(Resistance after high-temperature storage−Initial resistance)/Initial resistance}×100   Formula (2):

Test Example 6: Evaluation of Capacity Retention After Charge/Discharge at High-Temperature (45° C.)

Each of the lithium secondary batteries according to Examples 2 and 3 and Comparative Example 2 was subjected to formation at a current of 210 mA (0.1 C rate), and the battery was degassed (degassing process). Then, the battery was charged in a constant-current/constant-voltage (CC/CV) mode of 0.33 C/4.2 V under the condition of 4.2 V/0.05 C and discharged in a constant-current mode of 0.33 C/2.5 V, at 45° C. Herein, the discharge capacity measured by using PNE-0506 charger (available from PNE Solution Co., Ltd., 5 V, 6 A), after the assemblage of the cell and before the high-temperature storage, was defined as initial discharge capacity.

The above-mentioned charge/discharge process was taken as 1 cycle. Then, the discharge capacity measured after carrying out 200 charge/discharge cycles and the initial discharge capacity were put into the following Formula (3) to determine the capacity retention. The results are shown in the following Table 1.

Capacity retention (%)=(Discharge capacity after 200 cycles/Initial discharge capacity)×100   Formula (3):

Test Example 7: Evaluation of Increase in Resistance After Charge/Discharge at High-Temperature (45° C.)

Each of the lithium secondary batteries according to Examples 2 and 3 and Comparative Example 2 was subjected to formation at a current of 210 mA (0.1 C rate), and the battery was degassed (degassing process). Then, the battery was charged in a constant-current/constant-voltage (CC/CV) mode of 0.33 C/4.2 V under the condition of 4.2 V/0.05 C and discharged at 0.33 C at 45° C. so that the battery might be set to a charged state of SOC 50%. After that, a drop in voltage appearing under the application of a discharge pulse at a constant current of 2.5 C for 30 seconds was measured by using PNE-0506 charger (available from PNE Solution Co., Ltd., 5 V, 6 A) to obtain the initial resistance value.

The above-mentioned charge/discharge process was taken as 1 cycle. Then, the resistance value measured after carrying out 200 charge/discharge cycles and the initial resistance value were put into the following Formula (4) to determine an increase in resistance (%). The results are shown in the following Table 1.

Increase in resistance (%)={(Resistance after 200 cycles−Initial resistance)/Initial resistance}×100   Formula (4):

TABLE 1

| No. | Items Presence and content of additive | After high-temperature storage Capacity retention (%) | After high-temperature storage Increase in resistance (%) | After 200 charge/discharge cycles Capacity retention (%) | After 200 charge/discharge cycles Increase in resistance (%) |
|---|---|---|---|---|---|
| Example 2 | Formula 1a 0.2 wt % | 94.52 | 3.06 | 94.29 | −4.67 |
| Example 3 | Formula 1a 0.5 wt % | 94.97 | −5.19 | 94.34 | −6.60 |
| Comp. Ex. 2 | — | 94.20 | 3.37 | 93.97 | 1.90 |

As can be seen from Table 1, each of the batteries according to Examples 2 and 3 shows higher storage characteristics and life characteristics as compared to the battery according to Comparative Example 2. It can be seen from the result that when an initial SEI film is formed well and the deterioration of the film is inhibited, it is possible to improve the storage and cycle characteristics of a battery.

What is claimed is:

1. A non-aqueous electrolyte for a lithium secondary battery, comprising:
   a lithium salt;
   an organic solvent; and
   an additive comprising a compound represented by Chemical Formula 1:

[Chemical Formula 1]

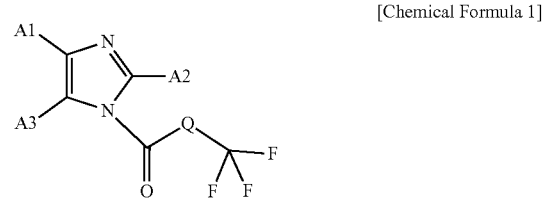

wherein Q is a single bond, or a substituted or non-substituted C1-C10 alkylene group, and each of A1, A2 and A3 independently represents hydrogen (H) or a non-substituted C1-C10 alkyl group.

2. The non-aqueous electrolyte for a lithium secondary battery according to claim 1, wherein Q is a linear or branched alkylene.

3. The non-aqueous electrolyte for a lithium secondary battery according to claim 2, wherein at least one hydrogen atom of the linear or branched alkylene is substituted with a halogen atom selected from Cl, F, Br or I.

4. The non-aqueous electrolyte for a lithium secondary battery according to claim 1, wherein the additive comprises a compound represented by Chemical Formula 1a:

[Chemical Formula 1a]

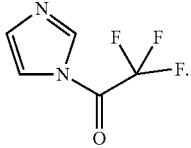

5. The non-aqueous electrolyte for a lithium secondary battery according to claim 1, wherein the lithium salt comprises $Li^+$, as a cation, and at least one of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH$, $CH_3SO_3^-$, $CF_3(CF_2)_7SO_3^-$, $CF_3CO_2^-$, $CH_3CO_2^-$, $PO_2F_2^-$, $SCN^-$ or $(CF_3CF_2SO_2)_2N^-$, as an anion.

6. The non-aqueous electrolyte for a lithium secondary battery according to claim 1, wherein the additive is present in an amount of 0.1 wt % to 2 wt % based on 100 wt % of the non-aqueous electrolyte.

7. The non-aqueous electrolyte for a lithium secondary battery according to claim 1, wherein the additive is present in an amount of 0.3 wt % to 1.5 wt % based on 100 wt % of the non-aqueous electrolyte.

8. A lithium secondary battery, comprising:
a positive electrode;
a negative electrode;
a separator; and
the non-aqueous electrolyte of claim 1.

* * * * *